United States Patent Office 3,067,210
Patented Dec. 4, 1962

---

3,067,210
CUMARIN PHOSPHORIC ESTERS AND PROCESSES FOR THE PRODUCTION THEREOF
Gerhard Schrader, Wuppertal-Cronenberg, Germany, assignor to Farbenfabriken Bayer Aktiengesellschaft, Leverkusen, Germany, a corporation of Germany
No Drawing. Filed Nov. 25, 1960, Ser. No. 71,450
Claims priority, application Germany Dec. 1, 1959
13 Claims. (Cl. 260—343.2)

The present invention relates to and has as its objects new and useful insecticidal thiophosphoric acid esters and processes for their production. Generally the new compounds of this invention may be represented by the following formula:

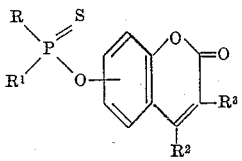

in which R and R¹ together with the remaining part of the molecule form of thiophosphonic or thiophosphinic acid ester of an hydroxy cumarin. In the cumarin radical R² and R³ may stand for hydrogen, lower alkyl groups, halogen atoms and the like.

Corresponding thiophosphoric acid esters of hydroxy cumarins are already known from literature and some representatives of this group have become of importance in practice.

In accordance with the present invention the new thiophosphonic and thiophosphinic acid esters of hydroxy cumarins can be obtained in a way known in principle, from the preparation of thiophosphoric acid esters. In this case there are reacted corresponding, suitable thiophosphonic or thiophosphinic acid halides with possibly substituted hydroxy cumarins. The reaction preferably is carried out in the presence of a suitable acid binding agent, but it is also possible to react a corresponding phenate (e.g. of an alkali-metal) with a corresponding thionophosphonic or thionophosphinic acid halide. The following equation may illustrate this reaction:

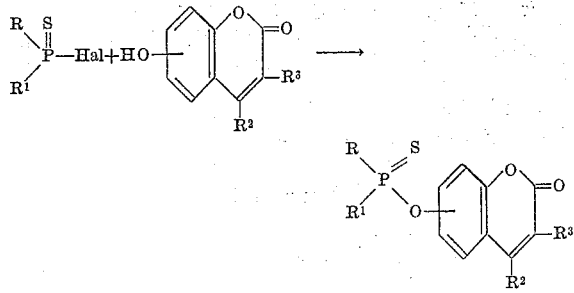

Inert organic diluents in which the reaction preferably takes place are such as acetonitrile, acetone, methyl-ethyl-ketone, benzene and the like. To result good yields the addition of a catalytic amount of copper-powder is sometimes advisable.

The inventive thiophosphonic or thiophosphinic acid esters of hydroxy cumarins are in some respects better than the corresponding thiophosphoric acid esters already known. Thus it is sometimes possible to combat such insects successfully with the inventive compounds which became resistant against the corresponding thiophosphoric acid esters already known. Also the new compounds are sometimes more active in another field, as they combat insects against which the corresponding thiophosphoric acid esters only show a slight activity.

The new compounds of the present invention very effectively kill insects like flies, mites, aphids, etc. They distinguish themselves especially by good contact-insecticidal activity and at the same time by an activity on eating insects such as caterpillars. The compounds may be used in the same manner as other known phosphoric acid insecticides, i.e. in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers, etc.

As an example for the special utility of the inventive compounds the ester of the following formula:

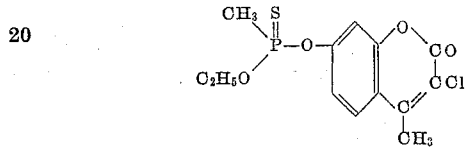

has been tested against spider mites (contact-insecticidal action).

Aqueous solutions of the aforementioned compound have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration. The tests have been carried out as follows:

Bean plants (*Phaseolus vulgaris*) of about 15 inches height were sprayed drip wet with solutions as prepared above in a concentration as shown below. The bean plants have been infested heavily with the two-spotted spider (species *Tetranychus telarius*). Evaluation has been carried out after 24 hours, 48 hours and 8 days. The following results have been obtained:

Spider mites were killed completely with 0.001% solutions.

The following examples are given for the purpose of illustrating the process according to the invention:

Example 1

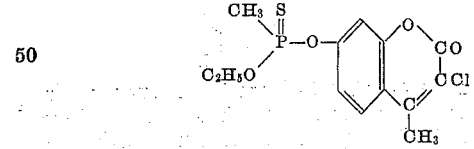

58 g. (0.25 mol) of a sodium salt of 4-methyl-3-chloro-7-hydroxy-cumarin are suspended in 250 ml. of acetonitrile. While stirring there are added 40 g. of methyl-thiono-phosphonic-acid-O-ethyl-ester-chloride. The solution is stirred at 45° C. for one hour and the reaction product is then poured into 300 ml. of ice-water. The separated oil is taken up in 200 ml. benzene and the organic layer is washed with water. Then it is dried over sodium-sulfate and the solvent thereafter is distilled off. In this manner there are obtained 56 g. of the new ester as a slightly yellow, water-unsoluble oil. While standing the ester slowly crystallizes. It may be recrystallized from ligroin and then it has a melting point of 67° C. Yield 67% of the theoretical.

On rats per os the ester has a toxicity of 10 mg./kg. (LD₅₀). Caterpillars are killed completely with a solution of 0.1% active ingredient. Spider mites are killed completely with 0.001% solutions.

Example 2

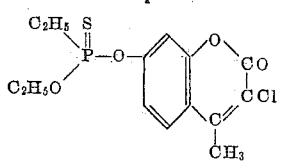

58 g. of a sodium-salt of 4-methyl-3-chloro-7-hydroxy-cumarin are suspended in 150 ml. of acetonitrile. Thereafter there are added while stirring thoroughly 44 g. of ethyl-thiono-phosphonic acid-O-ethyl-ester-chloride at 75° C. The temperature is kept at 80° C. for one hour and the mixer is worked up as described in Example 1. In this manner there are obtained 46 g. of the new ester as a white crystalline substance. It may be recrystallized from ligroin and the ester there has a melting point of 78° C. Yield 52% of the theoretical. $LD_{50}$ on rats per os 25 mg./kg. Spider mites are killed completely with 0.01% solutions.

Example 3

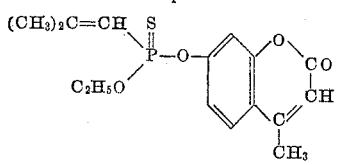

44 g. (0.25 mol) 4-methyl-7-hydroxy-cumarin are suspended in 150 ml. of methyl-ethyl-ketone. Then there are added 40 g. of pulverized, anhydrous potassium-carbonate and 1 g. of copper-powder. While stirring thoroughly there are added dropwise 51 g. of isobutenyl-thiono-phosphonic acid-O-ethyl-ester-chloride (B.P.$_{0.01}$ 50° C.) at 75° C. The temperature is kept at 75° C. for 12 hours, the mixture is then cooled to room-temperature and the reaction product is poured into 400 ml. of ice-water. The separated oil is taken up in 300 ml. of benzene and the benzenic layer is then washed with water. The benzenic solution is dried over sodium-sulfate. After distilling off the solvent there are obtained 30 g. of a new ester as a water-unsoluble, light-yellow oil. Yield 37% of the theoretical. On rats per os the ester has a medium toxicity of 500 mg./kg.

Example 4

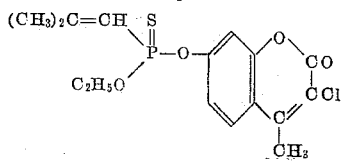

52 g. (0.25 mol) 4-methyl-3-chloro-7-hydroxy-cumarin are suspended in 150 ml. of methyl-ethyl-ketone. There are added 40 g. of a finely pulverized potassium-carbonate and 1 g. of copper-powder. At 75° C. there are added dropwise under further stirring 51 g. of isobutenyl-thiono-phosphonic-acid-O-ethyl-ester-chloride. The temperature is kept at 75° C. for 12 hours and the mixture is then worked up as described in the foregoing examples. In this manner there are obtained 30 g. of the new ester as a yellow, water-unsoluble oil. Yield 33% of the theoretical. On rats per os the ester has a medium toxicity of 500 mg./kg.

Example 5

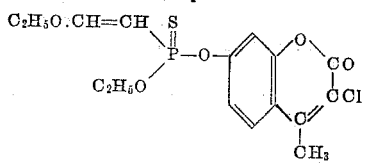

52 g. (.025 mol) 4-methyl-3-chloro-7-hydroxy-cumarin are suspended in 150 ml. of methyl-ethyl-ketone. There are added 40 g. of finely pulverized potassium-carbonate and 1 g. of copper-powder. Thereafter there are added dropwise while stirring thoroughly 55 g. of β-ethoxy-vinyl-thiono-phosphonic-acid-O-ethyl-ester-chloride at 75° C. The temperature is kept at 75–80° C. for 12 hours and the mixture is worked up in the usual manner. By this way there are obtained 50 g. of the new ester as a water-unsoluble, crystalline product. M.P. 76° C. (from alcohol). Yield 52% of the theoretical. On rats per os the ester has a toxicity ($LD_{50}$) of 50 mg./kg. 3 p.p.m. concentrations show a 100% activity against blow-flies.

Example 6

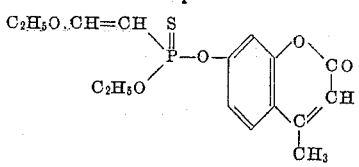

44 g. (0.25 mol) 4-methyl-7-hydroxy-cumarin are suspended in 150 ml. of methyl-ethyl-ketone. There are added 1 g. of copper-powder and 40 g. of finely pulverized potassium-carbonate and at 75° C. there are added dropwise 55 g. of β-ethoxy-vinyl-thiono-phosphonic-acid-O-ethyl-ester-chloride. The reaction-product is kept at 75–80° C. for 12 hours and then worked up as usual. In this manner there are obtained 44 g. of the new ester as a viscous, water-unsoluble oil. Yield 50% of the theoretical. Colorado-beetles are killed completely with 0.01% solutions. Also spider-mites are killed effectively with 0.01% solutions. Caterpillars are killed completely with solutions containing 0.1% active ingredient.

Example 7

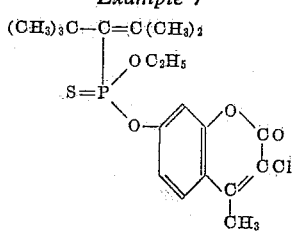

From 52 g. 4-methyl-3-chloro-7-hydroxy-cumarin and 65 g. di-isobutenyl-thiono-phosphonic-acid-O-ethyl-ester-chloride (B.P.$_{0.01}$ 70° C.) there are obtained in a similar manner 55 g. of the above new ester as a yellow viscous oil. Yield 52% of the theoretical. On rats per os the ester has a toxicity $LD_{50}$ of 500 mg./kg.

Example 8

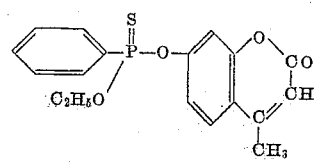

44 g. (0.25 mol) 4-methyl-7-hydroxy-cumarin are suspended in 150 ml. methyl-ethyl-ketone. To this solution there are added 40 g. of potassium-carbonate mixed with 1 g. of copper powder. At 75° C. there are added dropwise while stirring thoroughly 57 g. of phenyl-thiono-phosphonic-acid-O-ethyl-ester-chloride (B.P.$_{0.01}$ 75° C.). The temperature is kept at 75° C. for 12 hours and the mixture is then worked up in the usual way. There are obtained 31 g. of the new ester as a colorless, crystalline powder. B.P. 116°. Yield 35% of the theoretical. On rats per os the ester has a toxicity ($LD_{50}$) of 50 mg./kg. Mosquito larvae are killed completely with 0.001% solutions.

Example 9

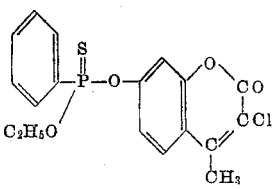

52 g. (0.25 mol) 4-methyl-3-chloro-7-hydroxy-cumarin are suspended in 150 ml. of methyl-ethyl-ketone. To this solution there are added 40 g. of finely pulverized potassium-carbonate and 1 g. of copper-powder. At 75° C. there are added while stirring 57 g. of phenyl-thiono-phosphonic-acid-O-ethyl-ester-chloride. At 75° C. the reaction-product is kept for 12 hours and is then worked up in the usual way. In this manner there are obtained 40 g. of the new ester as a colorless, crystalline powder of a melting point of 89° C. Yield 40% of the theoretical. On rats per os the ester has a toxicity ($LD_{50}$) of 50 mg./kg. Mosquito larvae are killed completely with 0.001% solutions.

By the same way there may be obtained the following compounds:

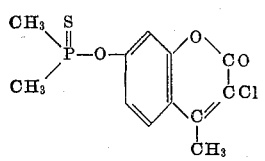

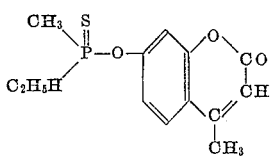

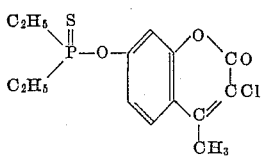

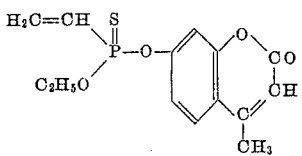

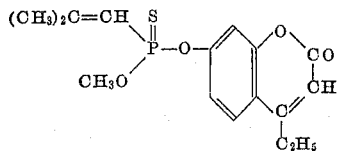

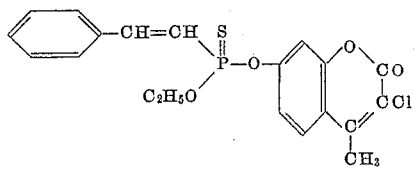

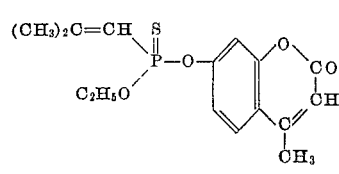

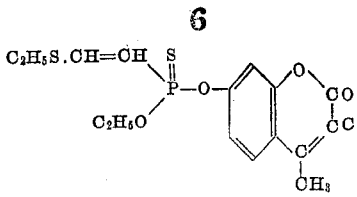

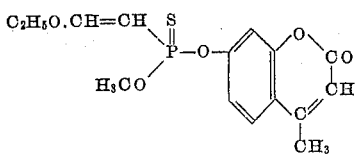

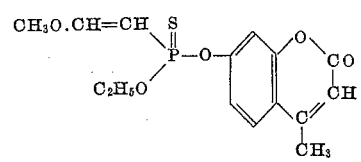

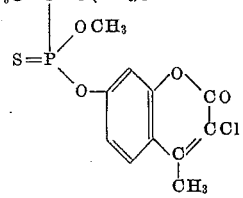

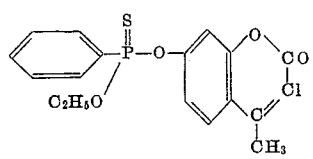

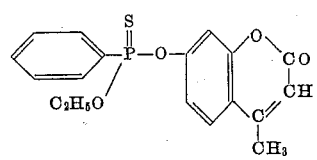

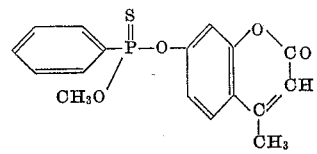

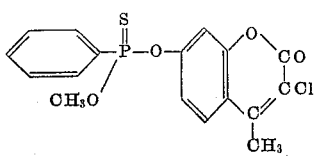

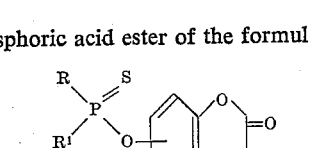

I claim:
1. A phosphoric acid ester of the formula:

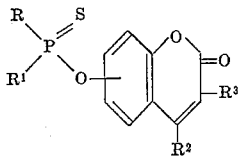

in which R stands for lower alkyl having up to 6 carbon atoms, phenyl, vinyl, lower alkyl-substituted vinyl, lower alkylmercapto-substituted vinyl, phenyl-substituted vinyl and lower alkoxy-substituted vinyl, $R^1$ stands for lower alkoxy and in case of R being lower alkyl $R^1$ may also be lower alkyl, $R^2$ stands for a member selected from the group consisting of hydrogen and lower alkyl and $R^3$ stands for a member selected from the group consisting of lower alkyl and halogen, and hydrogen.

2. The phosphoric acid ester of the following formula:

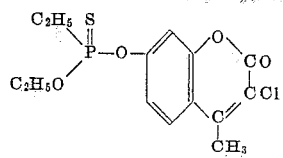

3. The phosphoric acid ester of the following formula:

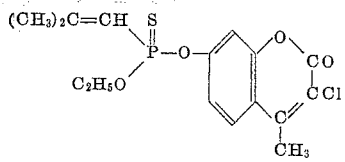

4. The phosphoric acid ester of the following formula:

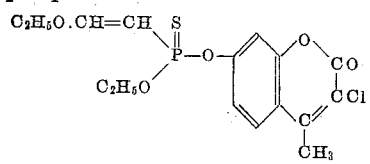

5. The phosphoric acid ester of the following formula:

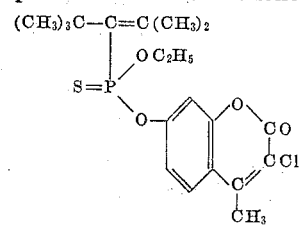

6. The phosphoric acid ester of the following formula:

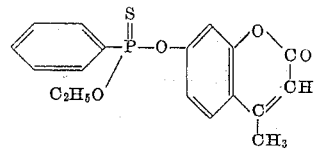

7. A phosphoric acid ester of claim 1 wherein R is lower alkyl having up to 6 carbon atoms, $R^1$ is lower alkoxy, $R^2$ is lower alkyl and $R^3$ is chloro.

8. A phosphoric acid ester of claim 1 wherein R is lower alkyl-substituted vinyl, $R^1$ is lower alkoxy, $R^2$ is lower alkyl and $R^3$ s hydrogen.

9. A phosphoric acid ester of claim 1 wherein R is lower alkyl-substituted vinyl, $R^1$ is lower alkoxy, $R^2$ is lower alkyl and $R^3$ is chloro.

10. A phosphoric acid ester of claim 1 wherein R is phenyl, $R^1$ is lower alkoxy, $R^2$ is lower alkyl and $R^3$ is chloro.

11. A phosphoric acid ester of claim 1 wherein R is lower alkoxy-substituted vinyl, $R^1$ is lower alkoxy, $R^2$ is lower alkyl, and $R^3$ is chloro.

12. A phosphoric acid ester of claim 1 wherein R is lower alkoxy-substituted vinyl, $R^1$ is lower alkoxy, $R^2$ is lower alkyl, and $R^3$ is hydrogen.

13. A phosphoric acid ester of claim 1 wherein R is phenyl, $R^1$ is lower alkoxy, $R^2$ is lower alkyl and $R^3$ is hydrogen.

No references cited.